Dec. 2, 1969    R. J. RICKERT    3,481,832
NUCLEAR REACTOR CORE AND CONTROL ELEMENT ARRANGEMENT
Filed April 14, 1967    6 Sheets-Sheet 1
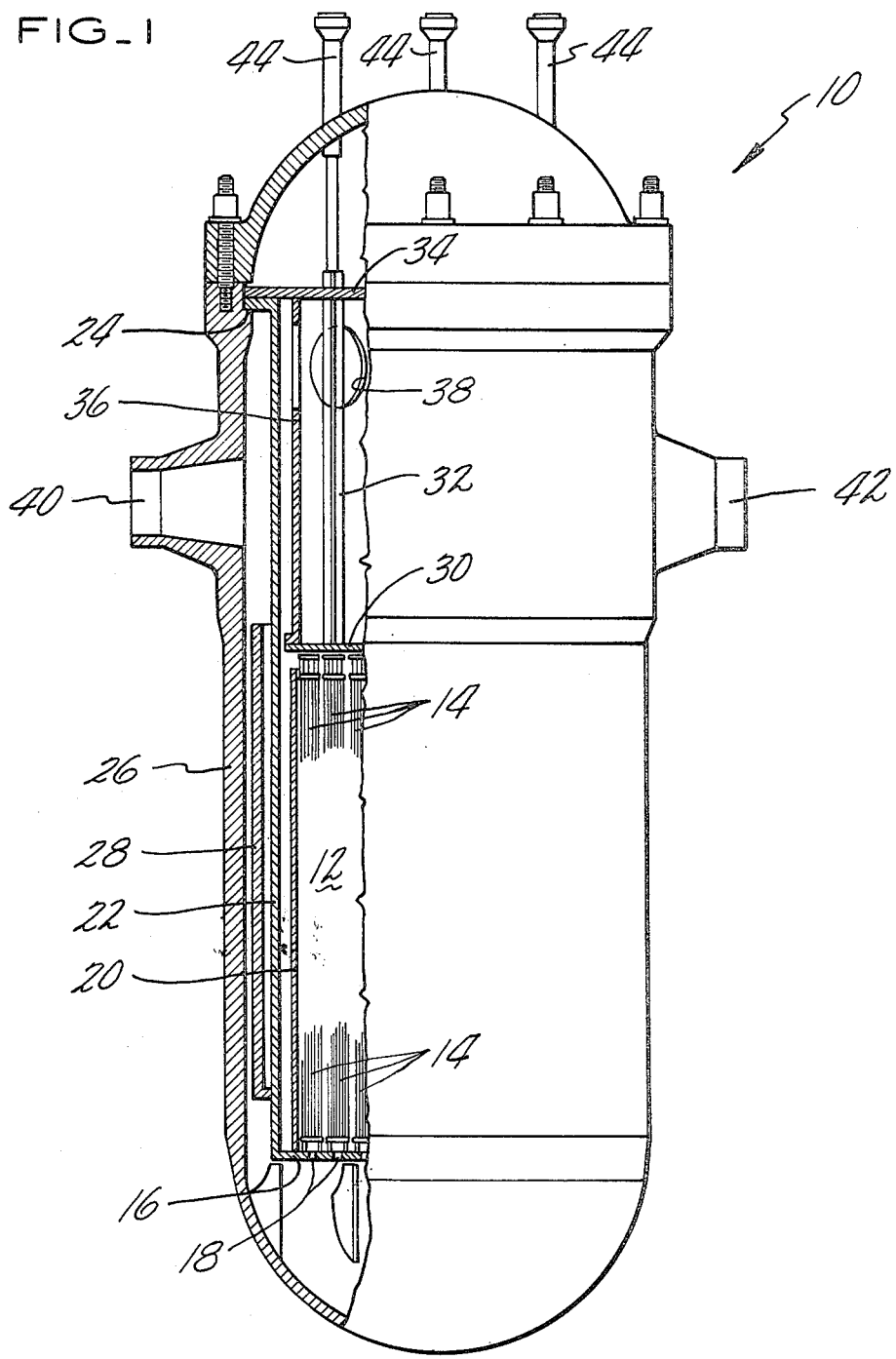
FIG_1
INVENTOR
ROYCE J. RICKERT
BY Richard H. Berneike
ATTORNEY Dec. 2, 1969    R. J. RICKERT    3,481,832
NUCLEAR REACTOR CORE AND CONTROL ELEMENT ARRANGEMENT
Filed April 14, 1967    6 Sheets-Sheet 2
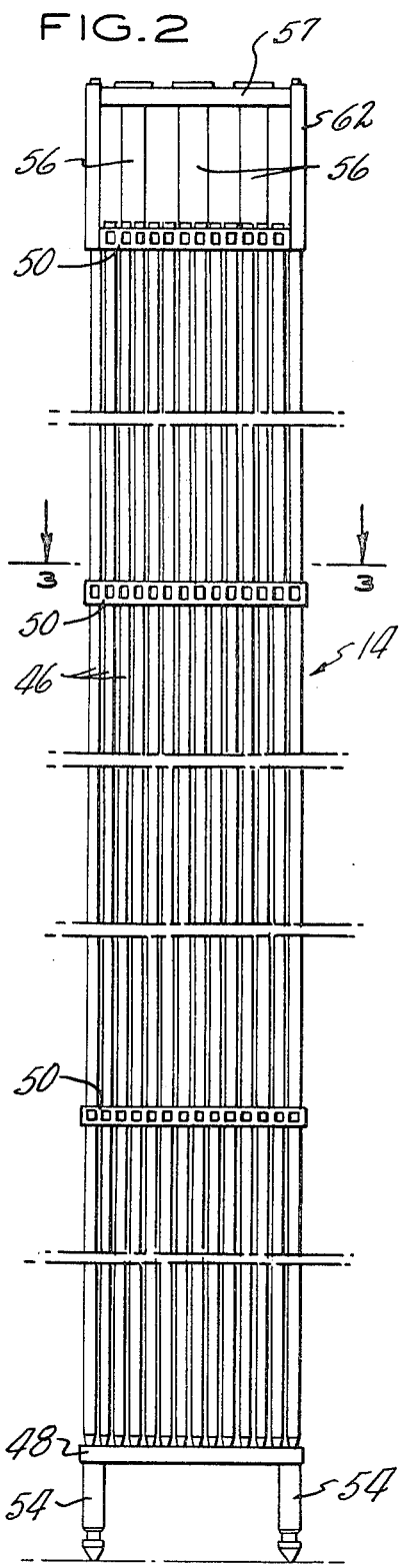
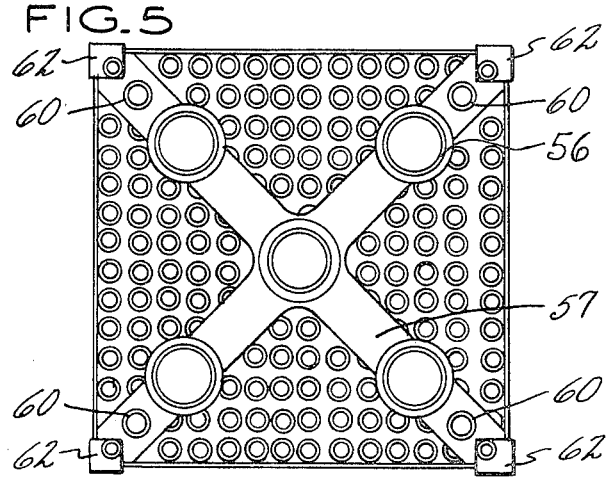
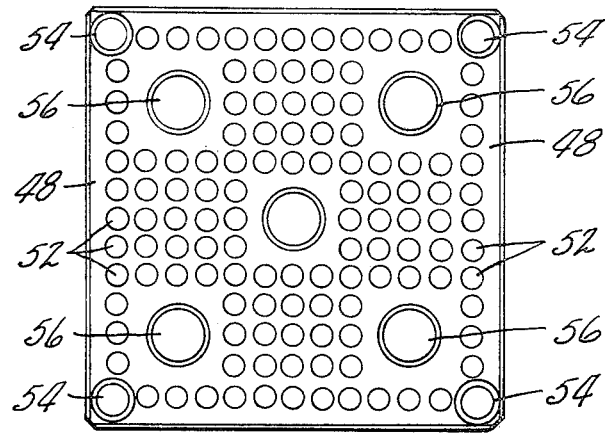
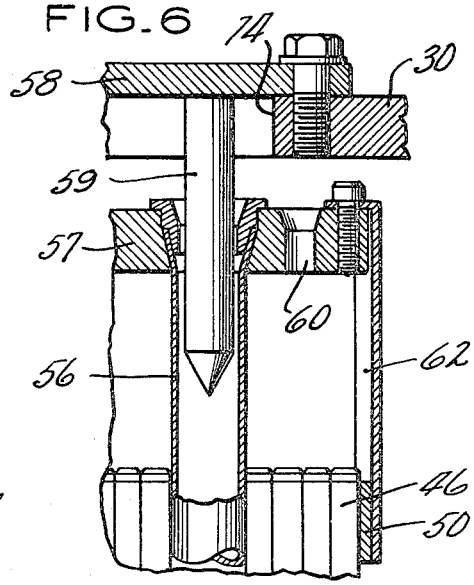

Dec. 2, 1969  R. J. RICKERT  3,481,832
NUCLEAR REACTOR CORE AND CONTROL ELEMENT ARRANGEMENT
Filed April 14, 1967  6 Sheets-Sheet 3
FIG_3
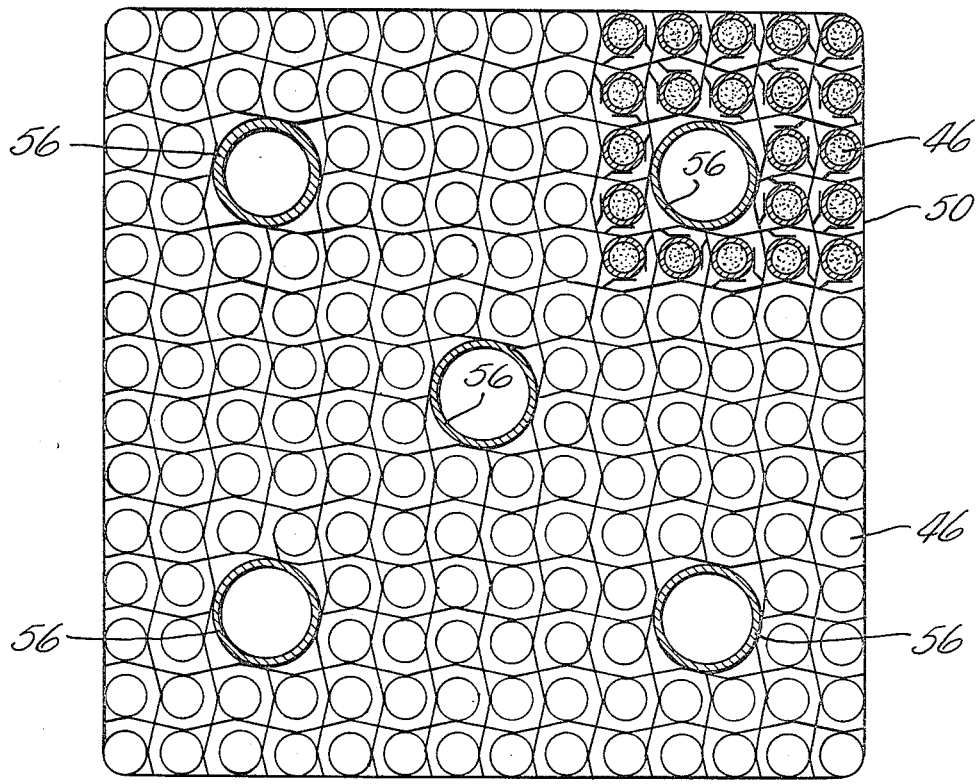
FIG_7
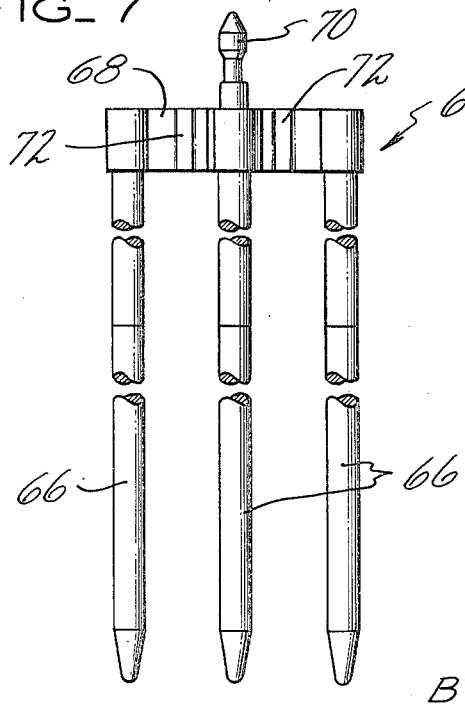
FIG.8
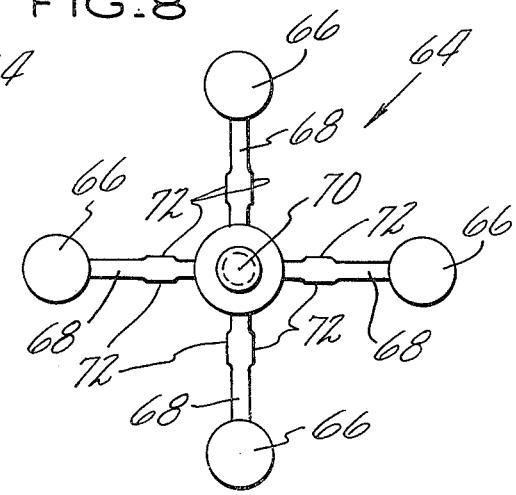
INVENTOR
ROYCE J. RICKERT
BY Richard H. Berneike
ATTORNEY Dec. 2, 1969  R. J. RICKERT  3,481,832
NUCLEAR REACTOR CORE AND CONTROL ELEMENT ARRANGEMENT
Filed April 14, 1967  6 Sheets-Sheet 4
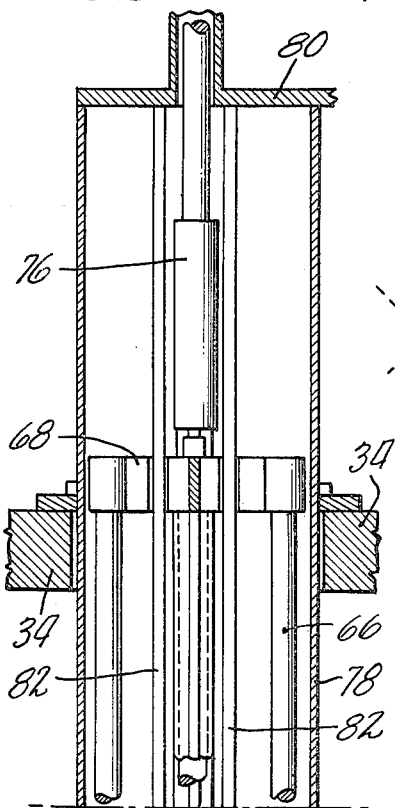
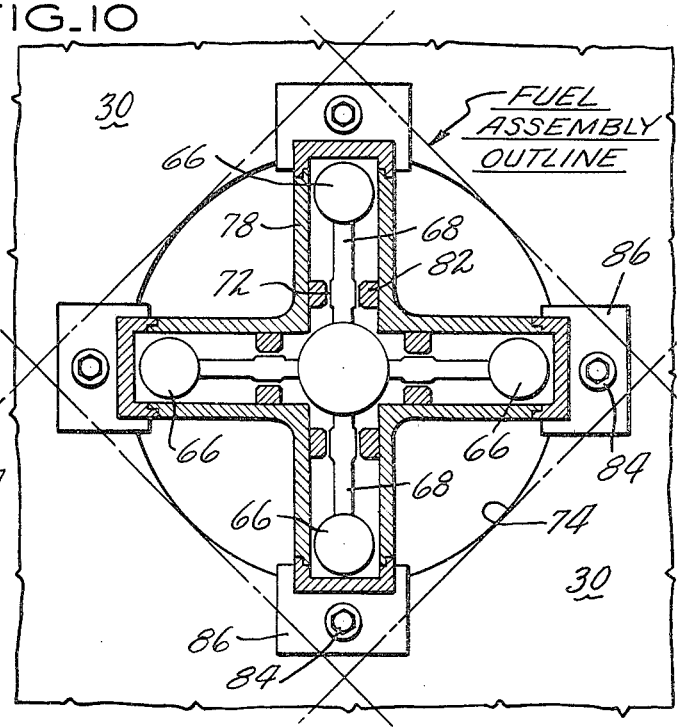
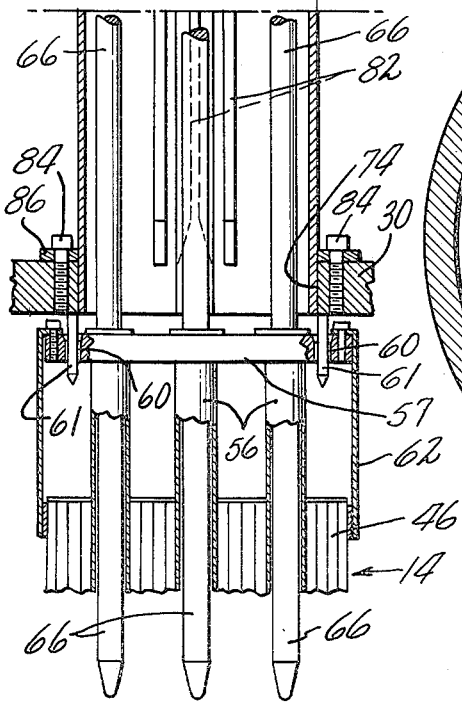
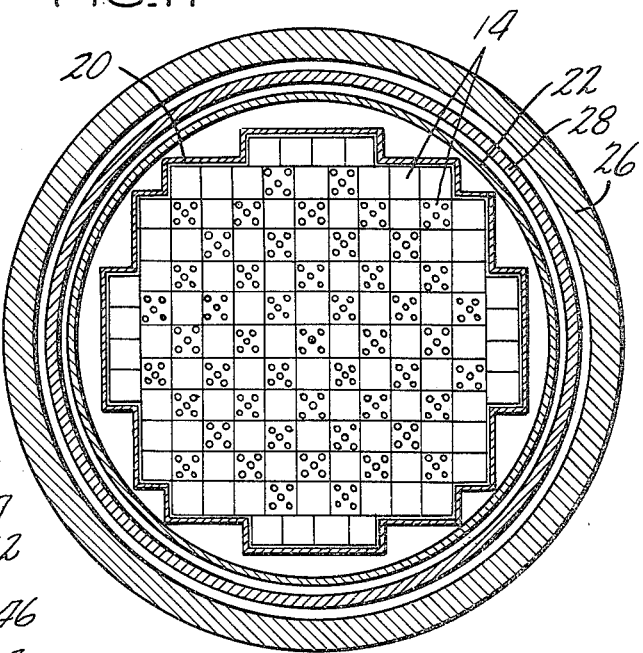
INVENTOR
ROYCE J. RICKERT
BY Richard H. Berneike
ATTORNEY Dec. 2, 1969  R. J. RICKERT  3,481,832
NUCLEAR REACTOR CORE AND CONTROL ELEMENT ARRANGEMENT
Filed April 14, 1967  6 Sheets-Sheet 5

INVENTOR
ROYCE J. RICKERT
BY Richard H. Berneike
ATTORNEY

FIG_14
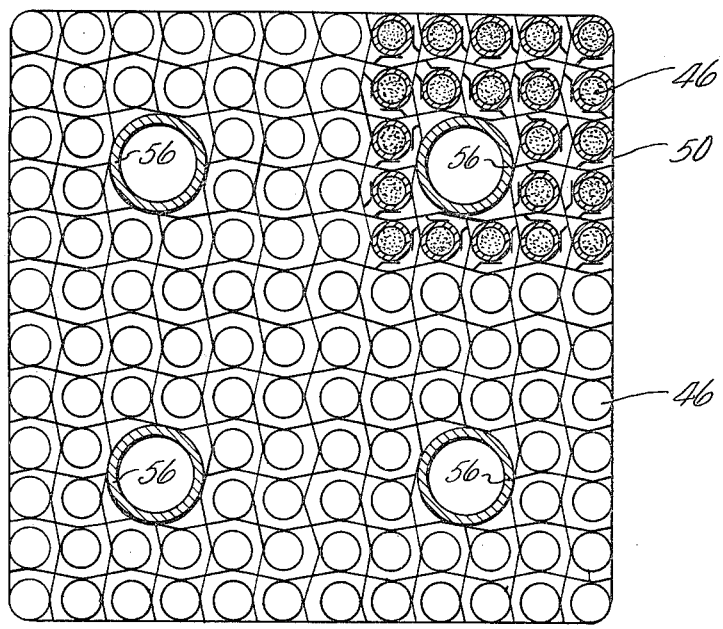

United States Patent Office 3,481,832
Patented Dec. 2, 1969

3,481,832
NUCLEAR REACTOR CORE AND CONTROL ELEMENT ARRANGEMENT
Royce J. Rickert, Bloomfield, Conn., assignor to Combustion Engineering, Inc., Windsor, Conn., a corporation of Delaware
Filed Apr. 14, 1967, Ser. No. 632,509
Int. Cl. G21c 3/04
U.S. Cl. 176—50                               11 Claims

ABSTRACT OF THE DISCLOSURE

A nuclear reactor having fuel element assemblies composed of a plurality of fuel elements in which a plurality of adjacent fuel elements are removed forming a relatively small number of relatively large coolant-moderator channels through the assemblies into which large control rod fingers may be inserted. These large coolant-moderator channels are closely and relatively uniformly spaced in a repetitive array throughout the core whereby the distance between any two such coolant channels will not be greater than several neutron diffusion lengths and the ratio of the maximum to average power density will be reduced. Control rod guide tubes in these coolant channels protect the control rod fingers and form a structural support for the fuel element assemblies. The large size and thus small number of control rod fingers simplifies their mounting, guiding, and shrouding and thus makes possible their uniform spacing.

BACKGROUND OF THE INVENTION

The proper design of control elements for a nuclear reactor involves many considerations including the relative dispersion of the control material throughout the core, the effect of the coolant in the control channels on power peaking in the adjacent fuel elements and the structural and mechanical problems involved both with the control elements and with the control element drives. Cruciform control rods have been employed in the past but the coolant channels left by the withdrawn control elements created rather high power peaking in the adjacent fuel elements due to the concentration of moderator at these locations. This, of course, limits the power output of the reactor since it is the peak power density rather than the average which determines the core thermal margin. The thermal margin is the difference between the actual heat flux and the burn-out heat flux or the heat flux at which the fuel elements fail. Control rod followers have been employed to fill these cruciform control rod channels when the control rods are withdrawn but these also present significant problems. The reactor vessel must be much taller to accommodate the greatly increased length of the control rod-follower combination. This not only greatly increases the cost of the reactor vessel but means that more primary coolant is necessary. The increased amount of primary coolant requires a much larger containment structure to retain the released materials in the event of an accident; or in the alternative, the containment structure must be able to withstand a significantly higher pressure. The use of control rod followers also requires shrouding for the followers and increases the cost for control rod drives due to the increased weight.

It has also been suggested in the past that a cluster of spaced control rod pins be employed in place of the cruciform control rods. A number of individual fuel elements are removed from the fuel assemblies corresponding to the number of control rod pins in each cluster and tubes are inserted in the fuel assemblies in place of each of the removed fuel elements. The control rod pins are sized and located in the cluster such that they fit down into the tubes. There might typically be on the order of sixteen such control rod pins in each cluster with a corresponding number of fuel rods removed from each fuel assembly. These pins have been conventionally arranged in a single or double circular pattern about the center axis of the cluster. Such prior art arrangements have several disadvantages. The large number of control pins in each cluster and the size of each pin creates structural problems in supporting the control pins and in shrouding the control pins in the withdrawn position to prevent vibration. It is also difficult to properly arrange such control pins within the core to achieve a regular and uniform power density distribution.

SUMMARY OF THE INVENTION

In accordance with the present invention, control element assemblies are employed each of which has a limited number of control rod fingers of a relatively large size. It has heretofore been considered impossible or impractical to remove a plurality of adjacent fuel elements or rods from a fuel element assembly to accommodate a control element since the large coolant channel created thereby would produce concentrations of neutron moderator and thus excessively high heat fluxes and temperatures in the surrounding fuel elements. It has been discovered, however, that this is true only when considering one such coolant channel in an infinite or large array of surrounding fuel and that by properly spacing and locating such control elements and coolant channels within the core arrangement, the power distribution will be acceptable and the maximum to average peak distribution will be reduced as desired. The principle involved in the invention is that these control rod fingers and the coolant channels are spaced within several neutron diffusion lengths of each other so that a low asymptotic neutron flux level cannot develop and persist before another coolant channel is reached. Thus, all fuel elements operate at power densities closer to the maximum value.

The practical diameter for the individual fuel elements in a reactor is a matter of balance between the increased cost of manufacturing the fuel elements necessary for a particular core when they are of a small diameter and the increasing fuel inventory costs and increased maximum temperature reached within fuel elements when they are of a larger diameter. As an example, in a water cooled reactor of either the boiling or pressurized type, a practical outside diameter for each of the individual fuel elements is in the neighborhood of 0.4 to 0.5 inch. Therefore, since the fuel elements are of a rather standard size, the size of the control rod fingers may be directly related to the number of fuel elements which must be removed for each control element. According to the present invention and considering fuel elements within a practical size range, four adjacent fuel elements are removed from the fuel assembly for each of the control rod fingers to form a generally square-shaped opening extending longitudinally through the fuel assemblies. There are five control rod fingers for each of the control rod assemblies, four fingers located in a square array around a centrally located fifth finger. There are five corresponding spaces or openings formed in each of the fuel element assemblies to accept the five fingers on the control element assemblies. Each group of fuel elements removed from the fuel assemblies is replaced with a control element guide tube which serves not only to encase the control rod fingers but also to structurally tie together and support the components of the fuel assembly. The fuel assemblies are preferably square with the guide tubes arranged symmetrically in the assembly such that the assemblies do not require any particular orientation within the core. All of the fuel assemblies will thus be interchangeable with each other. This same objective may be accomplished with the use of other arrangements such as hexagonal fuel assemblies.

BRIEF DESCRIPTION OF THE DRAWINGS

FIGURE 1 is an elevation view partially in cross section illustrating a nuclear reactor embodying the present invention;

FIGURE 2 is an elevation view of one fuel assembly;

FIGURE 3 is a cross section view of the fuel assembly of FIG. 2 taken along line 3—3;

FIGURE 4 is a bottom view of the fuel assembly of FIG. 2;

FIGURE 5 is a top view of the fuel assembly of FIG. 2;

FIGURE 6 is an enlarged vertical cross-sectional view of a corner of the uppermost portion of a fuel assembly also illustrating flow restricting means;

FIGURE 7 is an elevation view of the control element assembly of the present invention;

FIGURE 8 is a top view of the control element assembly of FIG. 6;

FIGURE 9 is a vertical section view illustrating the arrangement of the control element assembly relative to the fuel assemblies and illustrating the upper control element assembly guide structure or shroud;

FIGURE 10 is a horizontal cross section view illustrating the control element assembly within the upper guide structure which is affixed to the hold-down plate;

FIGURE 11 is a cross section view of the reactor illustrating the core geometry;

FIGURE 14 is a cross sectional area of a fuel assembly similar to FIGURE 3 illustrating an alternate arrangement.

DESCRIPTION OF THE INVENTION

Figure 13:
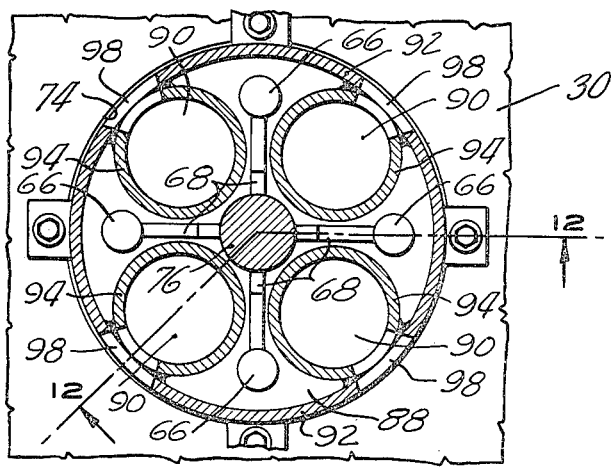
FIGURES 12 and 13 illustrate an alternate upper control element assembly guide structure or shroud.

Referring first to FIG. 1, there is illustrated a nuclear reactor 10 including a core assembly 12 made up of a plurality of fuel assemblies 14. These fuel assemblies 14 are supported in position by the lower support plate 16 which has apertures 18 therein for admitting coolant to the reactor core 12. Surrounding the core and also affixed to the lower support plate 16 is the core shroud 20. The lower support plate 16 and the entire core assembly is supported by the core support barrel 22 which hangs from the lip 24 on the reactor vessel 26. Located between the core support barrel 22 and the reactor vessel 26 in the region of the core is a thermal shield 28. Located above the fuel assemblies 14 and spaced slightly therefrom is a hold-down plate 30 which prevents the fuel assemblies from being forced upwardly out of position by the reactor coolant and which also supports the control element assembly shrouds 32 which will be described more fully hereinafter. The hold-down plate 30, which has suitable openings therein for the passage of reactor coolant (see 74 in FIG. 10), is suspended from the plate 34 by means of the casing 36. The casing has openings therein such as illustrated at 38 for the passage of reactor coolant. In operation, the coolant enters inlet nozzle 40 and flows downwardly around the outside of the core support barrel. The coolant then flows inwardly and up through the openings 18 in the lower support plate 16 and flows upwardly through the reactor core 12 wherein the coolant extracts heat. The coolant then flows up through the openings 74 in the hold-down plate 30 and outwardly through openings 38 and outlet nozzle 42. The control element assemblies, which will be described hereinafter, are connected to and driven by the control element assembly drives mounted on nozzles 44.

FIGS. 2, 3, 4, 5 and 6 illustrate the details of the fuel assemblies 14. These assemblies contain a plurality of fuel elements or rods 46 which contain the fissionable material. As an example, the fuel elements may be formed of Zircaloy cladding tubes containing sintered $UO_2$ pellets. These fuel elements are suitably affixed at their lower ends to the lower end fitting 48 which is illustrated in FIG. 4. Such attachment may be by bolting or welding or by the use of spring pins such as described in U.S. patent application 511,137 filed Dec. 2, 1965, by Andrew J. Anthony and Manuel B. Loureiro, now Patent No. 3,331,749. The fuel elements are supported at the top end and at several locations intermediate the ends by means of fuel spacer grids 50 as illustrated in FIGS. 2 and 3. The illustrated fuel spacer grid is more fully described in U.S. patent application 488,852 filed Sept. 21, 1965, by Andrew J. Anthony and Adolph W. Viets, Jr., now Patent No. 3,432,287. The details of the fuel support grids form no part of the present invention and any suitable support grid could be employed.

The lower end fitting 48 has a plurality of holes 52 therethrough for water or other coolant flow. Four pins 54 extend down from the lower end fitting 48 and support the fuel assemblies on the lower support plate 16.

Extending through the fuel assembly parallel with the fuel elements are five control element guide tubes 56. As can be seen from FIG. 3, four adjacent fuel elements 46 in a square array are removed from the fuel assemblies for each guide tube. The portions of the fuel spacer grids which separated the four removed fuel elements are also removed (or not put in originally) to accommodate the larger guide tube. Although the guide tubes 56 have been illustrated as being circular, they may be of any desired shape, such as square or octagonal. The lower ends of these tubes 56 are suitably attached to the lower end fitting 48. The upper ends of the guide tubes 56 extend above the upper ends of the fuel elements 46 and terminate at the upper end fitting 57, which is in the form of a cruciform as shown in FIG. 5. The guide tubes 56 are suitably attached to the end fitting 57 such as by the rolled joint as illustrated in FIG. 6.

The lower ends of guide tubes 56 preferably extend down through the lower end fitting 48 as indicated in FIG. 4 and they are suitably attached thereto such as by welding or a rolled joint. The lower ends of the guide tubes are thus open to permit a small amount of coolant to flow up through the tubes for cooling. The amount of coolant flowing up through the guide tubes is restricted by partially blocking the guide tubes at the upper end. As will be apparent hereinafter, the guide tubes in some of the fuel assemblies will be partially blocked by the presence of the control rod fingers in the upper ends of the tubes. However, since not all of the fuel assemblies are provided with control element assemblies, as indicated in FIG. 11, it is necessary to provide other means for blocking the tubes. As shown in FIG. 6, this may be accomplished by placing a generally cruciform-shaped support means 58 over the openings 74 in the hold-down plate 30 in the locations where there are no control element assemblies. Extending downwardly from the support means 58 are a plurality of pins 59 which extend down into the top of the guide tubes 56. There is a slight clearance between the pins and the guide tubes such that only the desired amount of coolant flow will be permitted through the guide tubes. These pins 59 may also serve as locating pins for the fuel assemblies. The pins 59 may also be attached to and extend down from the hold-down plate itself rather than from the separate support means 58.

Guide holes 60 are also provided in the upper end fitting 57. These holes are engaged by locating pins 61 (shown in FIG. 9) extending downwardly from the hold-down plate 30 to accurately locate and space the fuel assemblies which are not located by pins 59. The ends of the cruciform-shaped upper end fitting located at the corners of the fuel assembly are attached to the uppermost fuel spacer grid by means of the angle braces 62. These braces protrude outwardly slightly from the sides of the fuel assemblies as seen in FIGS. 2, 6 and 9 and serve to self-align the upper ends of the fuel assemblies when loading the core. The control element guid tubes 56 serve to tie together the entire fuel assembly in that they are all attached to both the upper and lower end fittings as well as being fastened to the spacer grids at selected points. The attachment to the spacer grids is preferably by welding.

In reactors such as pressurized water reactors in which the coolant remains at least primarily a liquid after passing upwardly through the core, there is a considerable amount of turbulence and cross flow of the coolant as it flows out from the top of the fuel elements. It is desirable that this turbulent flow be permitted to subside and that the amount of cross flow be reduced before there is any direct contact between the coolant and the control elements to minimize any hydraulic side force on the control elements. The space between the upper ends of the fuel elements 46 and the upper end of the guide tubes 56 provides a suitable distance for the fluid flow to recover so that any contact with the control element assemblies at the point when they emerge from the guide tubes 56 will not be disastrous.

FIG. 7 and 8 illustrate, respectively, the elevation and top views of the control element assembly 64. This assembly comprises five control rod fingers 66; four fingers located in a square array around the centrally located fifth finger. The fingers 66 are joined at their upper ends by a generally cruciform shaped spider 68. The hub of the spider with its extension 70 serves to couple the control element assembly to the control element drive mechanism. Each of the control rod fingers 66 comprises a tube, such as Inconel, containing a poison or neutron absorbing material such as boron carbide. A gas expansion space is provided about the poison material to limit stresses due to internal developed by the release of gases. The spider 68 has bosses or protruding portions 72 which engage rub strips as will be explained hereinafter. FIG. 9 illustrates the mounting of the control element assemblies within the reactor and relative to the fuel assemblies. The control element assemblies extend down through openings in the plate 34 and the hold-down plate 30. The opening in hold-down plate 30 is illustrated at 74 in FIG. 10. The control element assemblies are attached at their upper ends to the control element assembly extension shafts 76 which extends upwardly to the control element assembly drive mechanisms on nozzles 44.

FIG. 9 in conjunction with FIG. 10 illustrates the shrouding for the control element assemblies located about the hold-down plate 30. It is necessary that the entire control element assembly be enclosed or shrouded at all times to protect the control rod fingers from turbulent and cross coolant flow which might cause excessive vibration and damage. When the control element assemblies are in the lowered position, the fingers are protected by the control element guide tubes 56. When the control element assemblies are withdrawn from the core, they are generally in the position shown in FIG. 9 with the tips of the control rod fingers still extending into the control element guide tubes. There is, therefore, never any danger of jamming the ends of one of the fingers against the top of the fuel element assemblies and thus preventing the control element assemblies from being lowered into the core. The fingers in the guide tubes also provide the regulation of the coolant flow up through the guide tubes as previously discussed. However, the major portion of the control rod fingers in the raised or withdrawn position lies above the hold-down plate 30, and it is thus necessary to provide shrouding throughout this area. As shown in FIG. 9 and more clearly in FIG. 10, the shrouding consists of a cruciform-shaped casing 78 which extends from the lower surface of the hold-down plate 30 to a location above the top of the control element assembly in the raised position. This shrouding is enclosed at the top by the cap 80 through which extends the control element assembly drive extension shaft. Located on the inner surface of the shroud 78 are the guide or bearing strips 82 which extend generally throughout the length of the shroud and which bear against the bosses 72 on the spider 68. These guide strips and the bosses are sized such that the only engagement between the shroud and the control element assemblies is at these locations thereby preventing the control rod fingers 66 from engaging or contacting the shrouding. The shrouding 78 is attached to the hold-down plate 30 by means of the bolts 84 and the extensions 86.

The water or other coolant flowing upwardly from the fuel assemblies will flow through the opening 74 in the hold-down plate 30 and into the space surrounding the shrouds 78. Very little coolant will flow up into the interior portion of the shrouds since these are substantially enclosed structures providing no fluid flow path. Therefore, there will be very little fluid flow directly adjacent the control rod fingers and certainly no flow sufficient to cause significant hydraulic side forces and vibration. The only area in which such flow could take place is between the upper ends of the control element guide tubes 56 and the bottom of the shrouding 78, which is a very short distance.

As previously stated, it has heretofore been considered impractical to remove even as many as four adjacent fuel elements from a fuel element assembly to accommodate a large control rod since the large water or coolant hole created thereby would produce a very irregular power distribution and excessively high temperatures in the surrounding fuel elements. It has been discovered, however, that by properly spacing such large coolant channels within the fuel assemblies and within the core arrangement, the power distribution will be entirely satisfactory. The illustrated and described fuel assembly has a square cross section with 14 fuel elements on a side. The fuel assemblies are square and symmetrical so that they may be completely interchangeable and will not require any particular orientation. The 14 by 14 array has been selected as being the most economical and convenient size. In a fuel assembly of such dimensions and containing fuel elements of conventional diameter, locations are provided for five control rod fingers as has been described with four fuel elements removed for each finger. Typical data for such a reactor arrangement would be as follows:

| | |
|---|---|
| Number of fuel assemblies | 133 |
| Fuel assembly outside dimensions, in. | 8.03 |
| Number of fuel rods per assembly | 176 |
| Fuel rod outside dimension, in. | 0.440 |
| Fuel rod pitch, square, in. | 0.580 |
| Active fuel length, in. | 128 |
| Total number of fuel rods | 23,408 |

FIG. 11 illustrates the arrangement of such a core and depicts the relationship of the control element assemblies to each other. Every other fuel assembly with the exception of the peripheral assemblies contains such a control element assembly. It may be desirable to have two or more of the control element assemblies connected together and attached to a common control element assembly drive mechanism. It will be understood that FIG. 11 illustrates only the control element assemblies within the core and that it does not show all the control element guide tubes 56. These guide tubes are located in each and every fuel assembly thus creating the desired regular pattern of coolant channels.

The present invention is also applicable to fuel assemblies containing other numbers of fuel elements with the corresponding adjustments being made in the number of control rod fingers per control element assembly. However, the control rod fingers per assembly would remain small in number and they would be of a relatively large size so as to replace a plurality of fuel elements. For instance, in a fuel assembly containing a 12 by 12 array of fuel elements as shown in FIGURE 14, there are only four control rod fingers per assembly rather than five. These are located in a square array just as the four outside fingers in the control element assembly of FIGURE 3 with the central finger being omitted. It would be possible in certain core designs to remove as many as nine fuel elements in a 3 by 3 square array for each of the control rod fingers. Of course, it is not necessary that the control rod fingers be cylindrical; they could be square or rectangular or any other desirable configuration as long as the basic principle of spacing the large holes in a regular pattern within a few neutron diffusion lengths of each other was observed. The cylindrical control rod fingers are preferable, however, in that they are best able to withstand the effects of pressure.

Figure 12:
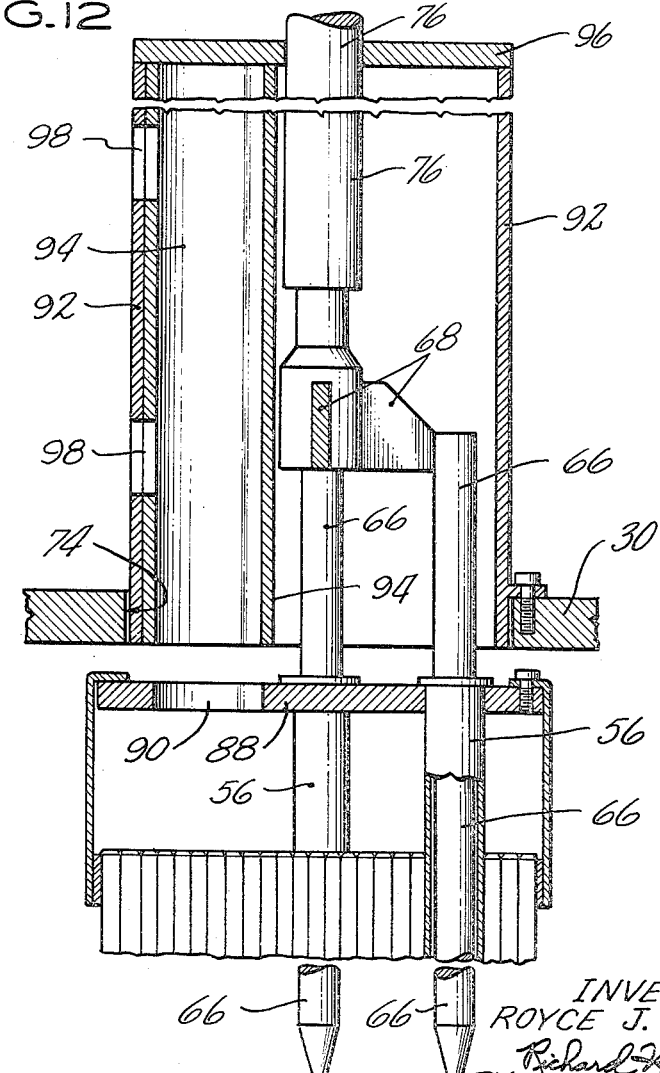

FIGS. 12 and 13 illustrate a modified type of upper control elements assembly guide structure or shroud. This alternate arrangement employs tubes or pipes which may be of a standard size and thus readily and inexpensively constructed. In this arrangement the modified upper end fitting 88 is a plate through which the guide tubes 56 extend just as with the cruciform end fitting 57. The end fitting 88 is otherwise solid except for four holes 90 through which the coolant flows upwardly. A cylindrical casing 92 is located over the openings 74 in the hold-down plate 30. Located within the casing 92 are four coolant conducting tubes 94 which lie directly over the four holes 90 in the upper end fitting 88. The casing 92 and the coolant conducting tubes 94 are all affixed to a cap 96. The coolant thus flows upwardly through the holes 90 and into the coolant conducting tubes 94. A plurality of holes 98 are cut through the sides of the casing 92 and the tubes 94 where they contact to permit the coolant to flow outwardly therefrom. The tubes 94 may be welded to the casing 92 around these openings 98 to fill in the spaces and form a seal. The control rod fingers 66 and spider 68 are located within the casing 92 and between the coolant conducting tubes 94 as shown in FIG. 13. Since the lower ends of the coolant conducting tubes 94 are in close proximity to the holes 90, substantially all of the coolant will flow directly up into these tubes 94 and there will be very little cross flow to cause hydraulic side forces on the control element fingers. The hole 74 in the hold-down plate 30, although still depicted as being circular, may be of other configuration. For instance, this hole could be square thus permitting some of the coolant to flow up from the core exterior of the casing 92 rather than through the tubes 94.

Although the control rod drive has been illustrated as being a top drive, it is also possible to place the drive below the control element assemblies and core. In such an arrangement, the central control rod finger would have an extension on the lower end which extends down through the core supporting structure and through nozzles in the bottom of the reactor vessel to the bottom drives. This arrangement is in other respects similar to the top drive arrangement and the extension merely force the control element assemblies up into the casing or shroud on top of the hold-down plate.

An additional advantage of the present invention is that in-core instrumentation can more readily be accomplished. Since the guide tubes are of a relatively large size and since many of them are empty, instruments of a practical size can be placed in the tubes. With the large size guide tubes and control rod fingers, there is also much more leeway in the tolerances which must be maintained and the clearances which can be provided between the tubes and fingers.

While preferred embodiments of the invention have been shown and described, it will be understood that this is illustrative rather than restrictive and that changes may be made without departing from the invention as claimed.

I claim:

1. A nuclear reactor comprising a plurality of longitudinally extending fuel element assemblies forming the reactor core, each of said fuel element assemblies having a plurality of longitudinally extending fuel elements generally arranged therein in a relatively uniformly spaced array and at least one channel extending longitudinally thereof, the majority of said fuel elements having a common cross sectional area, said channels being spaced throughout said reactor core in a regular and generally evenly spaced pattern within a few neutron diffusion lengths of each other, each of said channels having a cross sectional area substantially greater than that of one of said majority of said fuel elements and occupying a space in said uniformly spaced array equivalent to at least two of said fuel elements of said majority, and control elements comprising fingers each having a lateral cross sectional area substantially greater than the cross sectional area of each of said fuel elements of said majority, said control element fingers mounted so as to be movable longitudinally within at least some of said channels.

2. A nuclear reactor comprising a plurality of longitudinally extending fuel element assemblies forming the reactor core, the lateral cross sectional area of each of said fuel element assemblies divided into a plurality of zones each of a uniform area, a majority of said zones containing longitudinally extending fuel elements the majority of which are of a common cross sectional area, at least one control element guide means extending longitudinally through each of said fuel element assemblies, each of said guide means having a cross sectional area substantially greater than that of one of said majority of said fuel elements and occupying at least two of said zones and said guide means being spaced throughout said reactor core in a regular and generally evenly spaced pattern within a few neutron diffusion lengths of each other, and control elements comprising fingers each having a cross sectional area greater than the cross sectional area of one fuel element of said majority and adapted to fit into said guide means, said control elements and fingers mounted so as to be movable longitudinally within said guide means.

3. A nuclear reactor comprising a plurality of longitudinally extending fuel element assemblies constituting the reactor core, each of said fuel element assemblies having a plurality of longitudinally extending fuel elements therein the majority of which are of a common cross sectional area, said fuel elements arranged in said fuel element assemblies in a regular lattice array with each fuel element occupying one lattice position, said fuel element assemblies further including a plurality of guide means extending longitudinally through said fuel element assemblies and spaced throughout said reactor core in a regular and generally evenly spaced pattern within a few neutron diffusion lengths of each other, said guide means defining a plurality of channels extending longitudinally through said fuel element assemblies, the cross sectional area of each of said channels being at least equivalent to the portion of the cross sectional area of said fuel element assemblies occupied by two of said fuel elements of said majority, and thus occupying portions of at least two lattice positions, and control elements comprising fingers each having a cross sectional area substantially larger than the cross sectional area of each of said fuel elements of said majority, said control element fingers adapted to fit into selected ones of said channels and mounted so as to be movable longitudinally therein.

4. A nuclear reactor as claimed in claim 3 adapted for coolant flow longitudinally through said fuel element assemblies from a first end thereof to a second end thereof and wherein said control elements are longitudinally movable into and out of said fuel element assemblies from said second end and further including shrouding means located adjacent said second end and positioned so as to surround the portion of said control elements extending out of said fuel element assemblies and means for conducting said coolant flow from said fuel element assemblies exeterior of said shrouding means whereby said control elements are protected from said coolant flow by said guide means and said shrouding means.

5. A nuclear reactor as claimed in claim 3 wherein said guide means comprise cylindrical guide tubes extending longitudinally through said assemblies forming said channels and wherein said control element fingers are cylindrical.

6. A nuclear reactor as claimed in claim 5 wherein said lattice array of fuel elements within said fuel element assemblies is a square lattice array each having twelve fuel elements on a side and wherein four fuel elements are absent from four lattice positions in a square array for each of said channels and wherein there are four channels through each of said fuel element assemblies located in a square array about the center of said fuel element assembly and generally occupying the third and fourth lattice positions in from the sides of said fuel element assemblies.

7. A nuclear reactor as claimed in claim 5 wherein said fuel element assemblies have fourteen lattice positions on each side and wherein four fuel elements are absent from four lattice positions in a square array for each of said guide tubes and wherein there are five guide tubes through each of said fuel element assemblies, one guide tube located in the center of the fuel element assembly in the center four lattice positions and four guide tubes tubes located in a square array about the center and generally in the corners of said fuel assemblies and each occupying the third and fourth lattice positions inwardly from the two adjacent sides of said fuel element assemblies.

8. A nuclear reactor as claimed in claim 7 adapted for coolant flow longitudinally through said fuel element assemblies from a first end thereof to a second end thereof and wherein said control elements include means joining together five of said control element fingers into a unitary control element assembly movable longitudinally into and out of said selected channels from said second end and further including shrouding means located adjacent said second end and positioned so as to surround the portion of said control element assemblies extending out of said fuel element assemblies and means for conducting said coolant flow from said fuel element assemblies exterior of said shrouding means whereby said control element assemblies are protected from said coolant flow by said guide tubes and by said shrouding means.

9. A nuclear reactor as claimed in claim 8 wherein each of said shrouding means comprises a cruciform shaped casing enclosing said five control element fingers and said means joining together said fingers.

10. A nuclear reactor as claimed in claim 8 wherein each of said shrouding means comprises a cylindrical casing completely surrounding said control element assembly, four coolant flow tubes positioned within said casing between said control element fingers and conduits extending from said four coolant flow tubes to a position exterior of said casing whereby coolant may flow through said coolant conducting tubes and out through said casing.

11. A nuclear reactor as claimed in claim 8 wherein an end of said fuel elements in each of said fuel element assemblies terminates short of said second end of said fuel element assemblies and wherein said guide tubes extend beyond said ends of said fuel elements substantially to said second end of said fuel element assemblies and in close proximity to said shrouding means.

References Cited
UNITED STATES PATENTS

| | | | |
|---|---|---|---|
| 3,314,859 | 4/1967 | Anthony | 176—50 |
| 3,321,373 | 5/1967 | Challender | 176—86 |
| 3,346,459 | 10/1967 | Prince et al. | 176—61 |

CARL D. QUARFORTH, Primary Examiner

H. E. BEHREND, Assistant Examiner

U.S. Cl. X.R.

176—61, 78, 86